US011405775B2

United States Patent
Han et al.

(10) Patent No.: US 11,405,775 B2
(45) Date of Patent: Aug. 2, 2022

(54) THREE-ADDRESS SCHEME FOR FORWARDING FRAMES IN A WIRELESS MESH NETWORK

(71) Applicant: HEWLETT PACKARD ENTERPRISE DEVELOPMENT LP, Houston, TX (US)

(72) Inventors: Jianpo Han, Beijing (CN); Xuefu Wang, Beijing (CN); Guangzhi Ran, Beijing (CN); Qiang Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 935 days.

(21) Appl. No.: 15/780,525

(22) PCT Filed: Apr. 28, 2017

(86) PCT No.: PCT/CN2017/082372
§ 371 (c)(1),
(2) Date: May 31, 2018

(87) PCT Pub. No.: WO2018/195895
PCT Pub. Date: Nov. 1, 2018

(65) Prior Publication Data
US 2021/0176627 A1    Jun. 10, 2021

(51) Int. Cl.
*H04W 8/26* (2009.01)
*H04L 101/622* (2022.01)
(Continued)

(52) U.S. Cl.
CPC ........... *H04W 8/26* (2013.01); *H04L 61/6022* (2013.01); *H04W 40/22* (2013.01); *H04W 40/32* (2013.01); *H04W 84/12* (2013.01)

(58) Field of Classification Search
CPC ........................................................ H04W 8/26
See application file for complete search history.

(56) References Cited

U.S. PATENT DOCUMENTS 8,473,736 B2    6/2013   Gamer et al.
8,483,192 B2    7/2013   Chu et al.
(Continued)

FOREIGN PATENT DOCUMENTS

WO    WO-2006121879      11/2006
WO    2010/026512 A1     3/2010

OTHER PUBLICATIONS

Supplementary European Search Report and Search Opinion Received for EP Application No. 17861187.7, dated Apr. 4, 2019, 18 pages.
(Continued)

*Primary Examiner* — Jason E Mattis
(74) *Attorney, Agent, or Firm* — Hewlett Packard Enterprise Patent Department (57) ABSTRACT

Some examples relate to use of a three-address scheme for forwarding frames in a wireless mesh network (WMN). In an example, a node in a WMN may receive an Ethernet packet from a station outside of the WMN. The Ethernet packet may include a first address scheme comprising a destination address (DA) field, and a source address (SA) of the Ethernet packet. The Ethernet packet may be encapsulated in a second Ethernet packet comprising second address scheme. The second Ethernet packet may be encapsulated in an IEEE 802.11 frame comprising a third address scheme.

17 Claims, 5 Drawing Sheets

(51) Int. Cl.
*H04W 40/22* (2009.01)
*H04W 40/32* (2009.01)
*H04W 84/12* (2009.01)

(56) References Cited

U.S. PATENT DOCUMENTS

| | | |
|---|---|---|
| 9,271,218 B2 | 2/2016 | Denteneer et al. |
| 2006/0268715 A1 | 11/2006 | Zuniga et al. |
| 2007/0248065 A1 | 10/2007 | Banerjea et al. |
| 2008/0063002 A1 | 3/2008 | Zheng et al. |
| 2008/0253340 A1* | 10/2008 | Hirano ............... H04L 12/66 370/338 |
| 2008/0310342 A1* | 12/2008 | Kruys ............... H04W 40/02 370/328 |
| 2009/0003298 A1 | 1/2009 | Chu et al. |
| 2010/0115272 A1 | 5/2010 | Batta |
| 2011/0149804 A1* | 6/2011 | Denteneer ........... H04W 84/18 370/254 |
| 2012/0051346 A1* | 3/2012 | Herbert ............. H04L 61/103 370/338 |
| 2013/0301553 A1* | 11/2013 | Klein ............... H04W 76/12 370/329 |
| 2014/0153577 A1* | 6/2014 | Janakiraman ........ H04L 61/25 370/392 |

OTHER PUBLICATIONS

Calsoft Labs (White Paper); "802.11s Wireless Mesh Solution"; printed Mar. 27, 2017; 19 pages.

International Searching Authority, The International Search Report and the Written Opinion, dated Jan. 25, 2018, PCT/CN2017/082372, 13 Pgs.

\* cited by examiner

Fig. 1

| Destination mac | Source mac | Eth-protocol | payload |

Fig. 2A

| RA mac | TA mac | Mesh-specific protocol | Destination mac | Source mac | Eth-protocol | payload |

Fig. 2B

| fc | dur | RA mac | TA mac | bssid | seq | 802.3 header with mesh-specific protocol | Des mac | Src mac | Eth-protocol | payload |

Fig. 2C

| C2-mac | C1-mac | Eth-protocol | payload |

Fig. 3A

| M1-mac | S1-mac | Mesh-specific protocol | C2-mac | C1-mac | Eth-protocol | payload |

Fig. 3B

| fc | dur | M1-mac | S1-mac | bssid | seq | 802.3 header with mesh-specific protocol | C2-mac | C1-mac | Eth-protocol | payload |

THREE-ADDRESS SCHEME FOR FORWARDING FRAMES IN A WIRELESS MESH NETWORK

BACKGROUND

A wireless mesh network (WMN) is a communications network made up of radio nodes organized in a mesh topology. Wireless mesh networks may include mesh clients, mesh routers and gateways. Wireless mesh networks may carry data over large distances by splitting the distance into a series of short hops. Intermediate nodes may cooperatively pass data between different points on the network.

BRIEF DESCRIPTION OF THE DRAWINGS

For a better understanding of the solution, embodiments will now be described, purely by way of example, with reference to the accompanying drawings, in which.

DETAILED DESCRIPTION

A WMN is a type of wireless communication which may be implemented over a Wireless LAN (WLAN). In WMNs, communications between nodes, and between nodes and clients may occur over a radio link.

Each device in a wireless mesh network is typically may be referred to as a mesh node, which may be communicatively coupled with multiple other mesh nodes at the same time. Wireless mesh networks are also multi-hop networks because each mesh node may reach another node going through multiple hops. Wireless mesh networks may be implemented with various wireless technologies, for example, Institute of Electrical and Electronics Engineers (IEEE) 802.11 standard.

A wireless distribution system (WDS) is a system enabling the wireless interconnection of access points in an IEEE 802.11 network. It allows a wireless network to be expanded using multiple access points without a wired backbone to link them. An access point can be either a main, relay, or remote base station. The IEEE 802.11 standard defines a 4-address frame format for wireless communication between access points, but does not describe how the frame format may be used. As a result, WDS may be incompatible between different products (from different or even same vendors) since the IEEE 802.11 standard does not define how access points may interact to arrange for exchanging frames of this format. Needless to say this is not a desirable scenario.

To address these technical challenges, the present disclosure describes various examples for using a three-address scheme for forwarding frames in a wireless mesh network. In an example, a node in a WMN may receive an Ethernet packet from a station outside of the WMN. The Ethernet packet may include a first address scheme comprising a destination address (DA) field identifying a destination of the Ethernet packet, and a source address (SA) field identifying a source of the Ethernet packet. The Ethernet packet may be encapsulated in a second Ethernet packet. The second Ethernet packet may include a second address scheme comprising a recipient address (RA) field, a transmitter address (TA) field, a field denoting a routing protocol used for routing packets across the WMN, and fields of the first address scheme. The RA field may include an address identifying an immediate recipient of the Ethernet packet. The TA field includes an address identifying a transmitter of the Ethernet packet.

The second Ethernet packet may be encapsulated in an IEEE 802.11 frame. The frame may include a third address scheme comprising a frame recipient address (FRA) field and a frame transmitter address (FTA) field, and fields of the second address scheme. The FRA field may include an address identifying an immediate recipient of the frame in the WMN. The FTA field may include an address identifying a transmitter of the frame in the WMN. The frame may be forwarded through a plurality of nodes in the WMN to the destination of the Ethernet packet based on a forwarding table maintained at each of the plurality of nodes.

Figure 1:
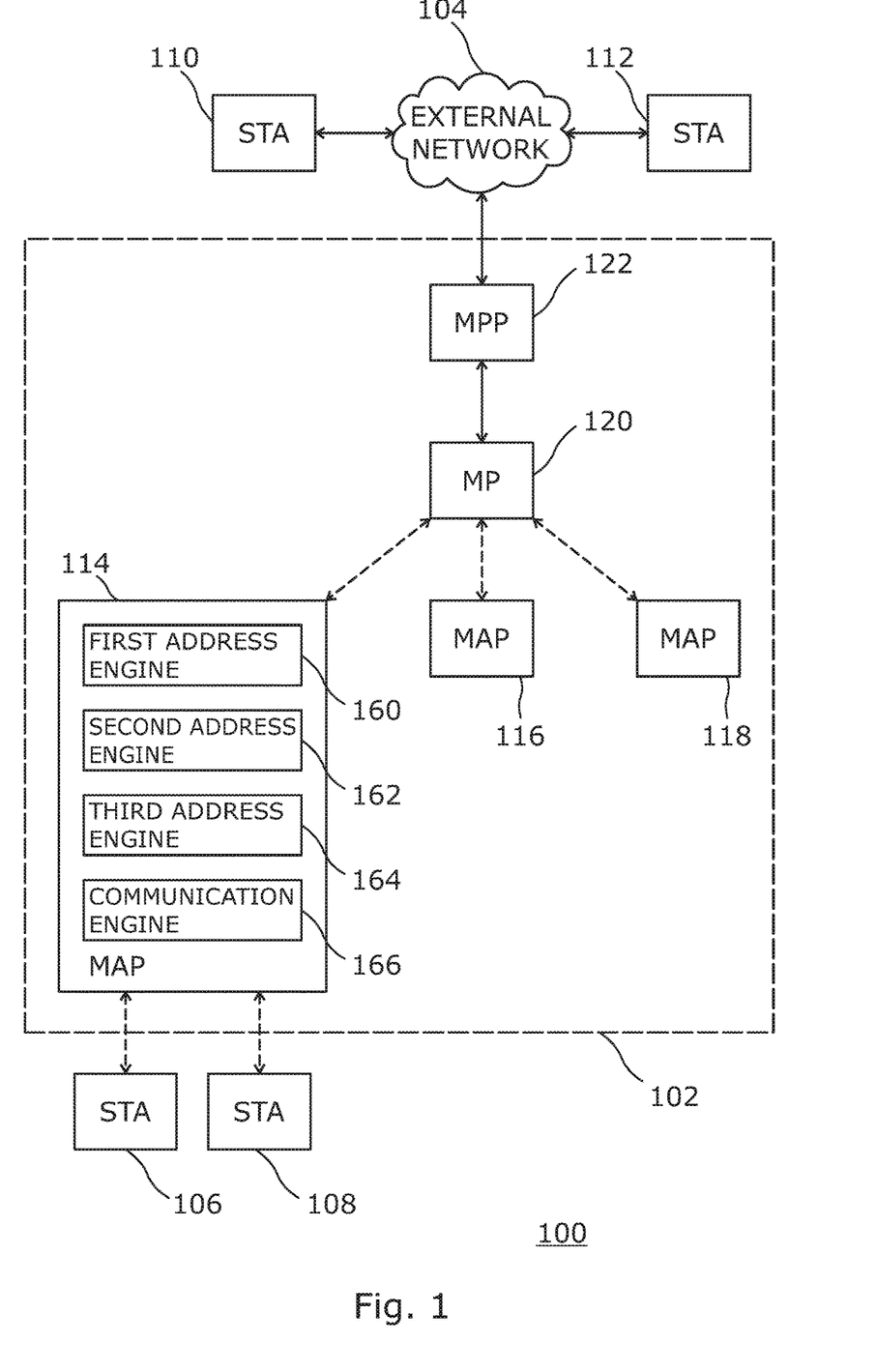
FIG. 1 is a block diagram of an example computing environment using a three-address scheme for forwarding frames in a wireless mesh network.

FIG. 1 is a block diagram of an example computing environment 100 using a three-address scheme for forwarding frames in a wireless mesh network. Computing environment 100 may include a wireless mesh network 102, an external network 104, and a plurality of stations (STAs) 106, 108, 110, and 112. In an example, wireless mesh network 102 may include an Institute of Electrical and Electronics Engineers (IEEE) 802.11 wireless local area network (WLAN). IEEE 802.11 is a set of media access control (MAC) and physical layer (PHY) specifications for implementing wireless local area network (WLAN) computer communication.

Wireless mesh network 102 may be communicatively coupled to external network 104. External network 104 may include, for example, a Local Area Network (LAN), a Wireless Local Area Network (WAN), a Metropolitan Area Network (MAN), a Campus Area Network (CAN), or the like. Further, external network 104 may be a public network (for example, the Internet) or a private network (for example, an intranet). In an example, external network 104 may include an IEEE 802.11 WLAN. In an example, external network 104 may include a layer 2 network.

As used herein, the term "station" may include a logical entity that is a singly addressable instance of a medium access control (MAC) and physical layer (PHY) interface to a wireless medium (WM). The wireless medium may be used to implement the transfer of IEEE 802.11 protocol data units (PDUs) between peer physical layer (PHY) entities of a WLAN (for example, 102). Some non-limiting examples of STAs may include a desktop computer, a notebook computer, a tablet computer, a server, a thin client, a mobile device, a personal digital assistant (PDA), a printer, or any other device that includes a MAC and PHY interface to a WM that complies with IEEE 802.11 standard.

In an example, stations 106 and 108 may be coupled to wireless mesh network 102, and stations 110 and 112 may be coupled to external network 104. Although four stations are shown in FIG. 1, other examples of this disclosure may include more or less than four stations. Likewise, although two stations each are shown as coupled to wireless mesh network and external network in FIG. 1, other examples of this disclosure may include more or less than two STAs coupled to wireless mesh network and external network.

Wireless mesh network 102 may include a plurality of nodes 114, 116, 118, 120, and 122. Although five nodes are shown in FIG. 1, other examples of this disclosure may include more or less than five nodes. As used herein, the term "node" may refer to include a mesh access point (MAP), a mesh point (MP), and/or a mesh point portal (MPP). An MAP (or access point "AP") may refer to an entity that includes one station (STA) and provides access to the distribution services, via the WM (for example, wireless mesh network 102) for associated STAs. An MAP may be an MP that supports the AP function and provides access for STAs. An MP may refer to a node that uses IEEE 802.11 MAC and physical layer protocols for wireless communication. An MP may support automatic topology discovery, automatic route discovery, and data packet forwarding. An MPP may refer to an MP that connects to wireless mesh network or another type of network (for example, external network). An MPP enables mesh nodes to communicate with external network.

In an example, nodes 114, 116, and 118 may be MAPs, node 120 may be an MP, and node 122 may be an MPP. Nodes 114, 116, 118, 120, and 122 in wireless mesh network 102 may communicate with each other via mesh links.

A station (for example, 106) may connect to wireless mesh network 102 through a link established with an access point (AP), forming a basic service set (BSS). For example, stations 106 and 108 may be coupled to wireless mesh network 102 via wired or wireless links. Stations 110 and 112 may be coupled to external network 104 via wired or wireless links. Wireless mesh network 102 may be a multi-hop network. APs on wireless mesh network 102 may forward wireless signals. Multiple APs may build a mesh topology where signals are routed from one AP to another AP and finally transmitted through the AP coupled to a wired network (for example, external network 104).

In the example of FIG. 1, node 114 may include a first address engine 160, a second address engine 162, a third address engine 164, and a communication engine 166. For the sake of simplicity in illustration, node 114 is shown to include first address engine, second address engine, third address engine, and communication engine. However, any of the other nodes (for example, 116, 118, and 120) may include first address engine, second address engine, third address engine, and communication engine as well.

Engines 160, 162, 164, and 166 may include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of node 114. In some examples, the at least one machine-readable storage medium may store instructions that, when executed by the at least one processing resource, at least partially implement some or all engines of node 114. In such examples, node 114 may include the at least one machine-readable storage medium storing the instructions and the at least one processing resource to execute the instructions.

Figure 2A:
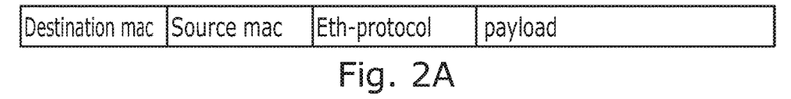
FIG. 2A illustrates an example first address scheme.

In an example, first address engine 160 on node 114 in a wireless mesh network (WMN) (for example, 104) may receive an Ethernet packet from a station (for example, 106) outside of the WMN. In an example, first address engine 160 may include a kernel forward layer in node 114. First address engine 160 may maintain a bridge table. In an example, the Ethernet packet may include a first address scheme. An example first address scheme is illustrated in FIG. 2A. An example first address scheme may comprise an Ethernet header and a payload field (or network data field). The Ethernet header may include a destination address (DA) field, a source address (SA) field, and a field denoting a protocol type of network data framed by the Ethernet packet. The destination address (DA) field may include a Media Access Control (MAC) address that identifies the destination of the Ethernet packet (for example, 110). The source address (SA) field may include a MAC address of the source of the Ethernet packet (for example, 106).

Figure 3A:
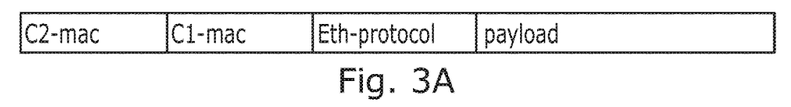
FIG. 3A illustrates an example first address scheme including example MAC addresses.

In an example, node 114 may receive an Ethernet packet from station 106. The destination for the Ethernet packet may be station 110. The MAC address for source station 106 may be defined as C1-mac, and the MAC address for destination station 110 may be defined as C2-mac. This is illustrated in FIG. 3A.

In an example, first address engine 160 may communicate the Ethernet packet to second address engine 162. In an example, second address engine 162 may include a mesh layer in node 114. In an example, second address engine 162 may interface with the bridge table in first address engine. The Ethernet packet may be communicated to the second address engine 162 by identifying the entry for the source MAC address in the bridge table. Second address engine 162 may encapsulate the Ethernet packet to generate a second Ethernet packet.

Figure 2B:
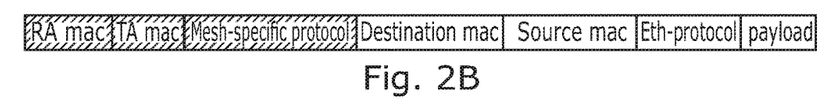
FIG. 2B illustrates an example second address scheme.

In an example, the second Ethernet packet may include a second address scheme. An example second address scheme is illustrated in FIG. 2B. In an example, the second address scheme may comprise a recipient address (RA) field, a transmitter address (TA) field, a field denoting a routing protocol used for routing packets across the WMN, and a payload field. The RA field may include a MAC address that identifies an immediate recipient of the second Ethernet packet. In an example, the immediate recipient may include an AP, MP, or a MPP in the WMN. The TA field may include a MAC address that identifies a transmitter of the second Ethernet packet. The routing protocol used for routing packets across the WMN may be specific to the WMN. In an example, the fields (for example, DA, SA, etc.) of the first address scheme may be included in the payload field of the second Ethernet packet.

Figure 3B:
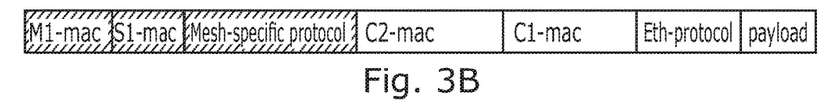
FIG. 3B illustrates an example second address scheme example MAC addresses.
Figure 3C:
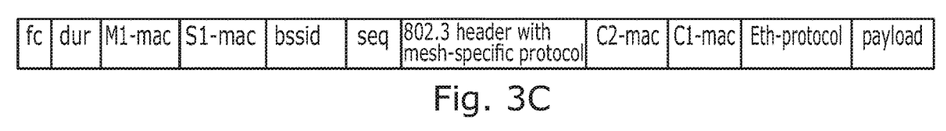
FIG. 3C illustrates an example third address scheme example MAC addresses.

In the context of the earlier example, second address engine 162 may identify VAP interface for C2-mac. If the MAC address of VAP interface for node 114 is defined as S1-mac, and the MAC address of VAP interface for station 112 is defined as M1-mac, second address engine 162 may encapsulate the Ethernet packet to generate a second Ethernet packet, which is illustrated in FIG. 3B.

In an example, second address engine 162 may communicate the second Ethernet packet to third address engine 164. In an example, third address engine 164 may include a wireless driver layer in node 114. Third address engine 164 may maintain a forwarding table on node 114. In an example, each entry in the forwarding table may include: a MAC address of the destination of the Ethernet packet and a corresponding Virtual Access Point (VAP). A VAP may refer to a logical entity that resides within a physical access point (AP). Every VAP appears as an independent AP to a client. The VAPs emulate the operations of a physical AP at the MAC level.

In an example, when third address engine 164 receives the Ethernet packet, third address engine 164 may refer to the forwarding table to identify the VAP interface for the destination MAC address of the Ethernet packet. Once third address engine 164 identifies the VAP interface, third address engine 164 may encapsulate the second Ethernet packet to generate an IEEE 802.11 frame. In the event there's no entry for the destination MAC address of the Ethernet packet in the forwarding table, the second Ethernet packet may be flooded on all VAP interfaces on node 114. This may enable third address engine 164 to identify a source MAC address, and define a corresponding VAP interface.

In an example, third address engine 164 may encapsulate the second Ethernet packet to generate an IEEE 802.11 frame. In an example, such encapsulation may include inserting the second Ethernet packet after the header of a standard IEEE 802.11 frame.

Figure 2C:
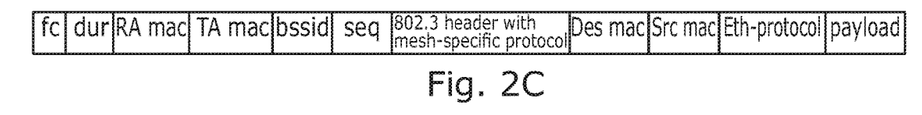
FIG. 2C illustrates an example third address scheme.

In an example, the IEEE 802.11 frame may include a third address scheme. An example third address scheme is illustrated in FIG. 2C. In an example, the third address scheme may comprise a frame control (FC) field, a duration field, a frame recipient address (FRA) field, a frame transmitter address (FTA) field, a basic service set identifier (BSSID) field, a sequence control field, and fields of the second address scheme. In the context of the earlier example, an example third address scheme including MAC address of VAP interface for node 114 and MAC address of VAP interface for station 112 is illustrated in FIG. 3B.

The FRA field may include an address that identifies an immediate recipient of the frame in the WMN. The FTA field may include an address that identifies a transmitter of the frame in the WMN. The FC may include control information used for defining the type of 802.11 MAC frame and providing information necessary for the following fields to understand how to process the MAC frame. The duration field may be used for all control type frames, except with the subtype of Power Save (PS) Poll, to indicate the remaining duration needed to receive the next frame transmission. The BSSID field may uniquely identify each BSS. When the frame is from an STA in an infrastructure BSS, the BSSID is the MAC address of the AP. The sequence control field may include two subfields: the fragment number field and the sequence number field. The sequence number field may indicate the sequence number of each frame. The fragment number field may indicate the number of each frame sent of a fragmented frame.

In an example, communication engine 166 may forward the frame to the immediate recipient. In an example, in a single hop WMN, the immediate recipient may be a mesh point portal (MPP) (for example, 120) in WMN that couples to external network 104. Upon receiving the frame, MPP may de-encapsulate the second Ethernet packet from the frame. MPP may then proceed to de-encapsulate the Ethernet packet from the second Ethernet packet. Once the Ethernet packet is extracted, MPP may transmit the packet to the destination MAC address in the Ethernet packet (for example, 110), for example, via external network 104. In an example, the destination of the Ethernet packet may include a second station (for example, 110) outside of the WMN. In an example, the second station may be device in an external network (for example, 104).

In another example, in a multi-hop WMN, there may be multiple immediate recipients (for example, AP 114 and MP 118) for the frame in the WMN before the Ethernet packet is transmitted to its destination MAC address. In such case, upon receiving the frame, an immediate recipient (for example, 114) in the WMN may first de-encapsulate the second Ethernet packet from the frame, and then proceed to de-encapsulate the Ethernet packet from the second Ethernet packet. Once the Ethernet packet is extracted, the immediate recipient may determine from its forwarding table a VAP interface on the immediate recipient that corresponds to the MAC address of the destination of the Ethernet packet. The immediate recipient may then encapsulate the Ethernet packet in a second Ethernet packet comprising a second address scheme as described earlier. The immediate recipient may then proceed to encapsulate the second Ethernet packet in an IEEE 802.11 frame comprising a third address scheme as described earlier. The immediate recipient may then forward the frame to the next recipient (for example, 118) in the WMN. In the event the next recipient is also an intermediate recipient of the frame, the next recipient may follow the same de-encapsulation and encapsulation procedure as described above before transmitting the frame to the next recipient. The procedure may be repeated at each immediate recipient until the frame is received by a last wireless recipient (for example, 120) in the WMN. Upon receiving the frame, the last recipient in the WMN may first de-encapsulate the second Ethernet packet from the frame, and then de-encapsulate the Ethernet packet from the second Ethernet packet. Once the Ethernet packet is extracted the last recipient in the WMN may transmit the packet to the destination MAC address in the Ethernet packet (for example, 110), for example, via external network 104.

Figure 4:
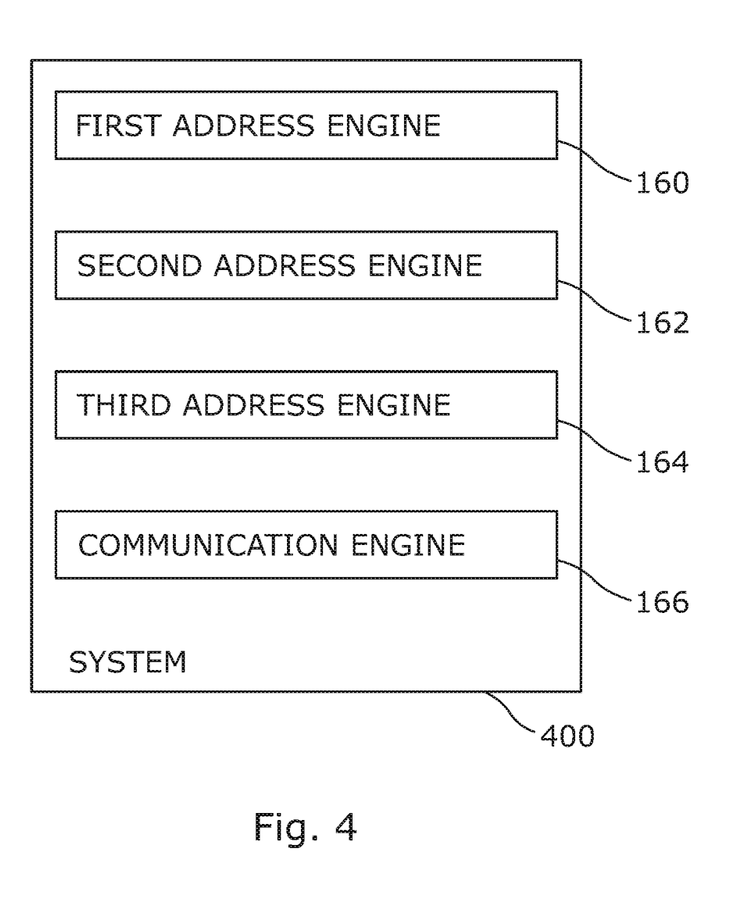
FIG. 4 is a block diagram of an example system using a three-address scheme for forwarding frames in a wireless mesh network.

FIG. 4 is a block diagram of an example system 400 using a three-address scheme for forwarding frames in a wireless mesh network. In an example, system 400 may be analogous to node 114, 116, 118, 120, or 122 of FIG. 1, in which like reference numerals correspond to the same or similar, though perhaps not identical, components. For the sake of brevity, components or reference numerals of FIG. 4 having a same or similarly described function in FIG. 1 are not being described in detail in connection with FIG. 2. Said components or reference numerals may be considered alike.

In an example, system 400 may include a first address engine 160, a second address engine 162, a third address engine 164, and a communication engine 166.

In an example, first address engine 160 may receive an Ethernet packet from a station outside of the WMN. The Ethernet packet may include a first address scheme comprising a destination address (DA) field identifying a destination of the Ethernet packet, and a source address (SA) field identifying a source of the Ethernet packet.

Second address engine 162 may encapsulate the Ethernet packet in a second Ethernet packet. The second Ethernet packet may include a second address scheme comprising a recipient address (RA) field, a transmitter address (TA) field, a field denoting a routing protocol used for routing packets across the WMN, and fields of the first address scheme. The RA field may include an address identifying an immediate recipient of the Ethernet packet, and the TA field may include an address identifying a transmitter of the Ethernet packet.

Third address engine 164 may encapsulate the second Ethernet packet in an IEEE 802.11 frame. The frame may include a third address scheme comprising a frame recipient address (FRA) field and a frame transmitter address (FTA) field, and fields of the second address scheme. The FRA field may include an address identifying an immediate recipient of the frame in the WMN, and the FTA field may include an address identifying a transmitter of the frame in the WMN.

Communication engine 166 may forward the frame to the immediate recipient for communication to a next recipient in the WMN based on a forwarding table maintained at the immediate recipient.

Figure 5:
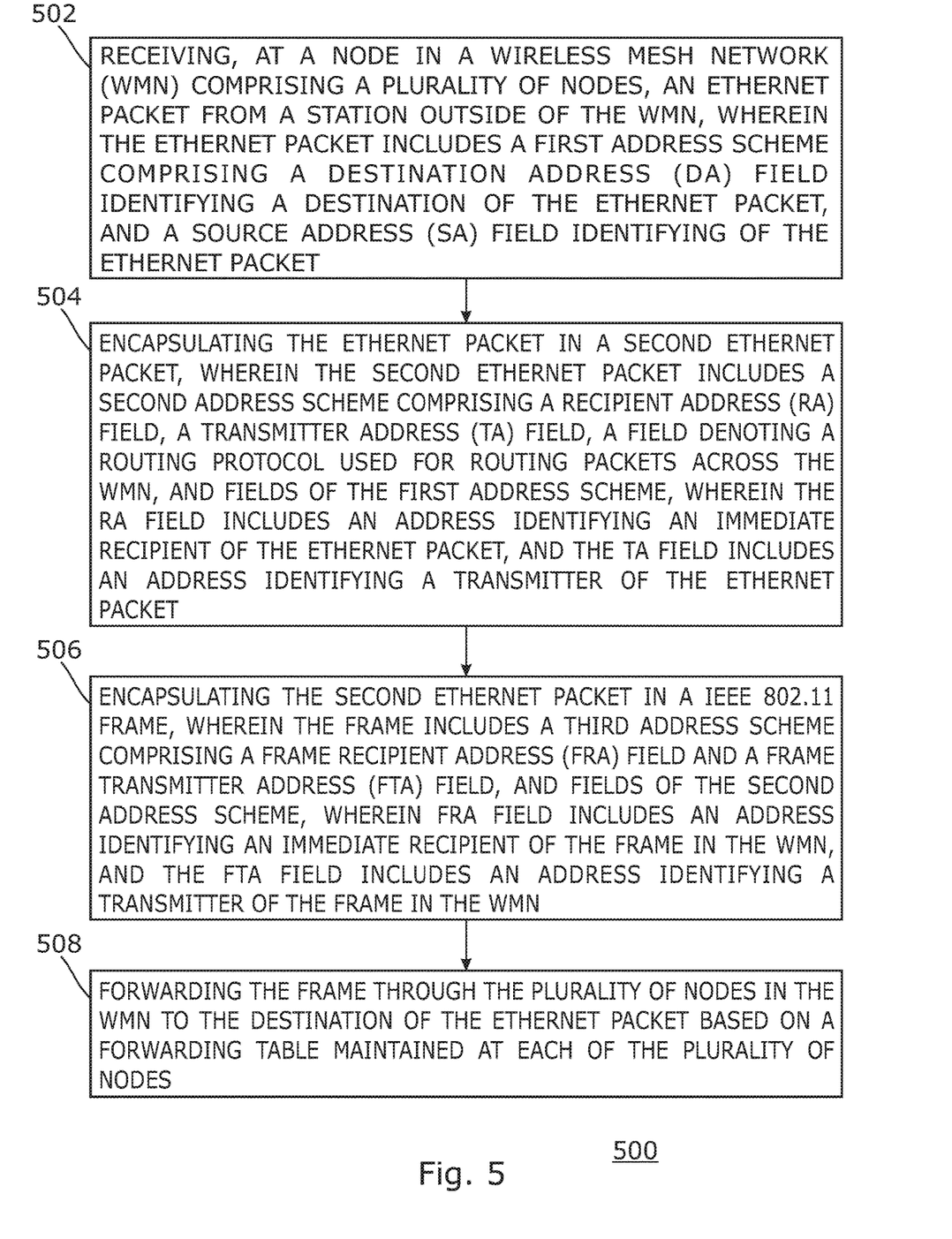
FIG. 5 is a block diagram of an example method of using a three-address scheme for forwarding frames in a wireless mesh network.

FIG. 5 is a block diagram of an example method 500 of using a three-address scheme for forwarding frames in a wireless mesh network. The method 500, which is described below, may be executed on a node such as nodes 114, 116, 118, and 120 of FIG. 1. However, other devices may be used as well.

At block 502, a node (for example, 106) in a WMN (for example, 102) may receive an Ethernet packet from a station outside of the WMN. The Ethernet packet may include a first address scheme comprising a destination address (DA) field identifying a destination of the Ethernet packet, and a source address (SA) field identifying a source of the Ethernet packet.

At block 504, the Ethernet packet may be encapsulated in a second Ethernet packet. The second Ethernet packet may include a second address scheme comprising a recipient address (RA) field, a transmitter address (TA) field, a field denoting a routing protocol used for routing packets across the WMN, and fields of the first address scheme. The RA field may include an address identifying an immediate recipient of the Ethernet packet. The TA field includes an address identifying a transmitter of the Ethernet packet.

At block 506, the second Ethernet packet may be encapsulated in an IEEE 802.11 frame. The frame may include a third address scheme comprising a frame recipient address (FRA) field and a frame transmitter address (FTA) field, and fields of the second address scheme. The FRA field may include an address identifying an immediate recipient of the frame in the WMN. The FTA field may include an address identifying a transmitter of the frame in the WMN.

At block 508, the frame may be forwarded through a plurality of nodes in the WMN to the destination of the Ethernet packet based on a forwarding table maintained at each of the plurality of nodes.

Figure 6:
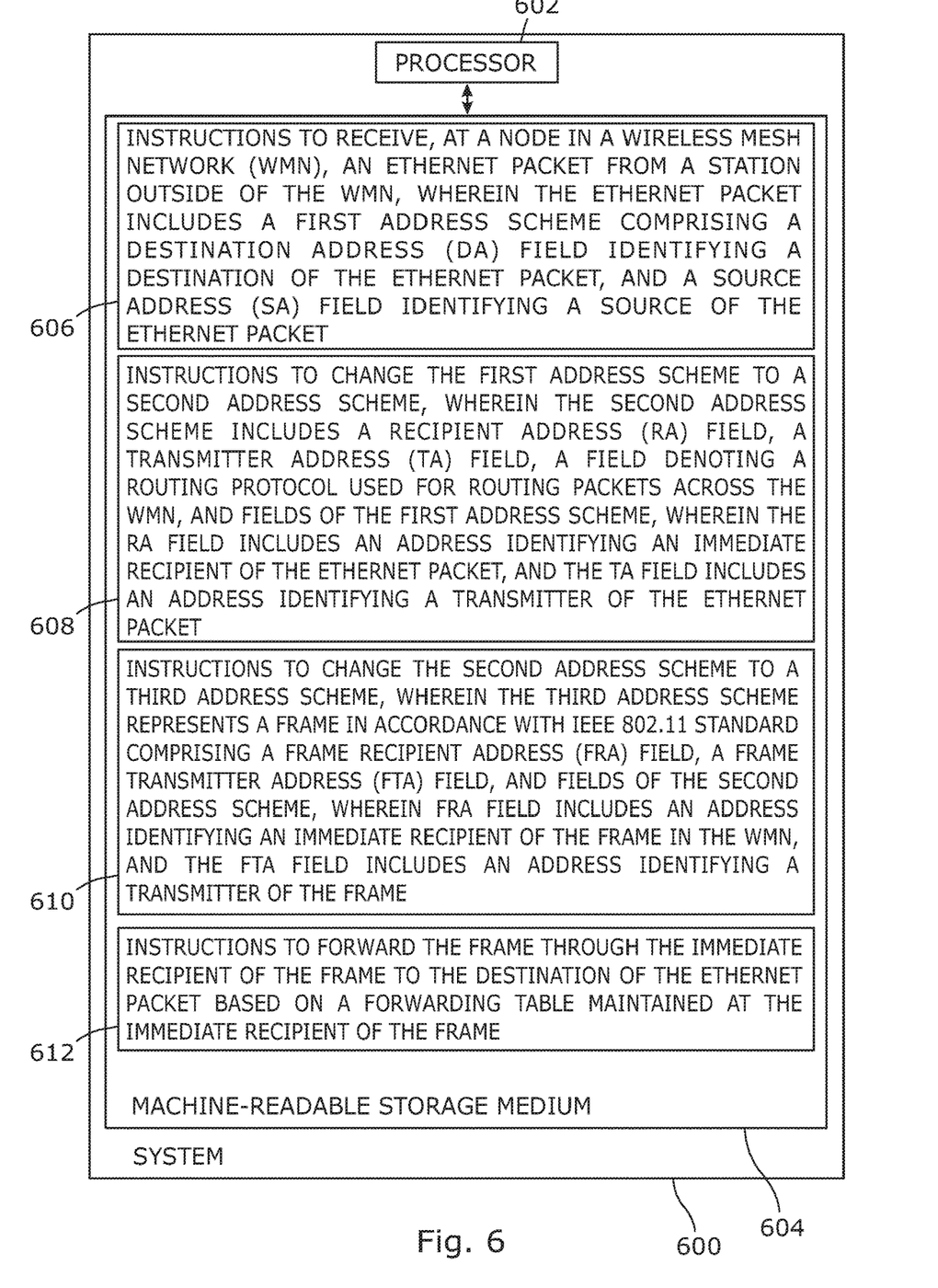
FIG. 6 is a block diagram of an example system including instructions in a machine-readable storage medium for using a three-address scheme for forwarding frames in a wireless mesh network.

FIG. 6 is a block diagram of an example system 600 including instructions in a machine-readable storage medium for using a three-address scheme for forwarding frames in a wireless mesh network.

System 600 includes a processor 602 and a machine-readable storage medium 604 communicatively coupled through a system bus. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium 604 may be a non-transitory machine-readable medium. In some examples, machine-readable storage medium 604 may be remote but accessible to system 600.

Machine-readable storage medium 604 may store instructions 606, 608, 610, and 612. In some examples, instructions 606 may be executed by processor 602 to receive, at a node in a wireless mesh network (WMN), an Ethernet packet from a station outside of the WMN. The Ethernet packet may include a first address scheme comprising a destination address (DA) field identifying a destination of the Ethernet packet, and a source address (SA) field identifying a source of the Ethernet packet. Instructions 608 may be executed by processor 602 to change the first address scheme to a second address scheme. The second address scheme may include a recipient address (RA) field, a transmitter address (TA) field, a field denoting a routing protocol used for routing packets across the WMN, and fields of the first address scheme. The RA field may include an address identifying an immediate recipient of the Ethernet packet, and the TA field includes an address identifying a transmitter of the Ethernet packet.

Instructions 610 may be executed by processor 602 to change the second address scheme to a third address scheme. The third address scheme may represent a frame in accordance with IEEE 802.11 standard comprising a frame recipient address (FRA) field, a frame transmitter address (FTA) field, and fields of the second address scheme. The FRA field may include an address identifying an immediate recipient of the frame in the WMN, and the FTA field includes an address identifying a transmitter of the frame. Instructions 612 may be executed by processor 602 to forward the frame through the immediate recipient of the frame to the destination of the Ethernet packet based on a forwarding table maintained at the immediate recipient of the frame.

For the purpose of simplicity of explanation, the example method of FIG. 5 is shown as executing serially, however it is to be understood and appreciated that the present and other examples are not limited by the illustrated order. The example systems of FIGS. 1, 4, and 6, and method of FIG. 5 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
receiving, at a node in a wireless mesh network (WMN) comprising a plurality of nodes, an Ethernet packet from a station outside of the WMN, wherein the Ethernet packet includes a first address scheme comprising a destination address (DA) field identifying a destination of the Ethernet packet, and a source address (SA) field identifying a source of the Ethernet packet;
encapsulating the Ethernet packet in a second Ethernet packet, wherein the second Ethernet packet includes a second address scheme comprising a recipient address (RA) field, a transmitter address (TA) field, a field denoting a routing protocol used for routing packets across the WMN, and fields of the first address scheme, wherein the RA field includes an address identifying an immediate recipient of the Ethernet packet, and the TA field includes an address identifying a transmitter of the Ethernet packet;
encapsulating the second Ethernet packet in a IEEE 802.11 frame, wherein the frame includes a third address scheme comprising a frame recipient address (FRA) field and a frame transmitter address (FTA) field, and fields of the second address scheme, wherein the FRA field includes an address identifying an immediate recipient of the frame in the WMN that is only directly connected with the WMN, and the FTA field includes an address identifying a transmitter of the frame in the WMN; and
forwarding the frame through the plurality of nodes in the WMN to the destination of the Ethernet packet based on a forwarding table maintained at each of the plurality of nodes.

2. The method of claim 1, wherein the forwarding comprises:
forwarding the frame to the immediate recipient for transmission to a next recipient until the frame is received by a last recipient in the WMN.

3. The method of claim 1, wherein the forwarding table comprises: the MAC address of the destination of the Ethernet packet and a corresponding Virtual Access Point (VAP).

4. The method of claim 1, wherein the second address scheme is changed to the third address scheme based on the forwarding table.

5. The method of claim 1, wherein the first address scheme comprises a field denoting a protocol type of network data framed by the Ethernet packet, and a network data field.

6. The method of claim 1, wherein the third address scheme comprises a frame control (FC) field, a duration field, a basic service set identifier (BSSID) field, and a sequence control field.

7. The method of claim 1, wherein encapsulating the second Ethernet packet in a IEEE 802.11 frame comprises inserting the second Ethernet packet in a body of the IEEE 802.11 frame after a header of the IEEE 802.11 frame.

8. A system in a wireless mesh network (WMN) comprising:
a first address engine to receive an Ethernet packet from a station outside of the WMN, wherein the Ethernet packet includes a first address scheme comprising a destination address (DA) field identifying a destination of the Ethernet packet, and a source address (SA) field identifying a source of the Ethernet packet;
a second address engine to encapsulate the Ethernet packet in a second Ethernet packet, wherein the second Ethernet packet includes a second address scheme comprising a recipient address (RA) field, a transmitter address (TA) field, a field denoting a routing protocol used for routing packets across the WMN, and fields of the first address scheme, wherein the RA field includes an address identifying an immediate recipient of the Ethernet packet, and the TA field includes an address identifying a transmitter of the Ethernet packet;
a third address engine to encapsulate the second Ethernet packet in a IEEE 802.11 frame, wherein the frame includes a third address scheme comprising a frame recipient address (FRA) field and a frame transmitter address (FTA) field, and fields of the second address scheme, wherein the FRA field includes an address identifying an immediate recipient of the frame in the WMN that is only directly connected with the WMN, and the FTA field includes an address identifying a transmitter of the frame in the WMN; and
a communication engine to forward the frame to the immediate recipient for communication to a next recipient in the WMN based on a forwarding table maintained at the immediate recipient.

9. The system of claim 6, wherein the destination of the Ethernet packet is a second station outside of the WMN.

10. The system of claim 9, wherein the second station is a device in an external network.

11. The system of claim 10, wherein the external network is a Layer 2 network.

12. The system of claim 10, wherein the third address engine encapsulates the second Ethernet packet in a IEEE 802.11 frame based on inserting the second Ethernet packet in a body after a header of the IEEE 802.11 frame.

13. A non-transitory machine-readable storage medium comprising instructions, the instructions executable by a processor to:
receive, at a node in a wireless mesh network (WMN), an Ethernet packet from a station outside of the WMN, wherein the Ethernet packet includes a first address scheme comprising a destination address (DA) field identifying a destination of the Ethernet packet, and a source address (SA) field identifying a source of the Ethernet packet;
change the first address scheme to a second address scheme, wherein the second address scheme includes a recipient address (RA) field, a transmitter address (TA) field, a field denoting a routing protocol used for routing packets across the WMN, and fields of the first address scheme, wherein the RA field includes an address identifying an immediate recipient of the Ethernet packet, and the TA field includes an address identifying a transmitter of the Ethernet packet;
change the second address scheme to a third address scheme, wherein the third address scheme represents a frame in accordance with IEEE 802.11 standard comprising a frame recipient address (FRA) field, a frame transmitter address (FTA) field, and fields of the second address scheme, wherein the FRA field includes an address identifying an immediate recipient of the frame in the WMN that is only directly connected with the WMN, and the FTA field includes an address identifying a transmitter of the frame; and
forward the frame through the immediate recipient of the frame to the destination of the Ethernet packet based on a forwarding table maintained at the immediate recipient of the frame.

14. The storage medium of claim 13, wherein the node includes an access point in the WMN.

15. The storage medium of claim 13, wherein the immediate recipient of the frame includes a mesh point (MP) in the WMN.

16. The storage medium of claim 13, wherein the immediate recipient of the frame includes a mesh access point (MAP) in the WMN.

17. The storage medium of claim 13, wherein the WMN is an IEEE 802.11 WLAN.

* * * * *